June 16, 1931.  J. E. LODGE  1,809,983
MATERIAL FEEDING DEVICE
Filed Jan. 2, 1929   2 Sheets-Sheet 1

Inventor
Joseph E. Lodge
By H A Pattison Atty.

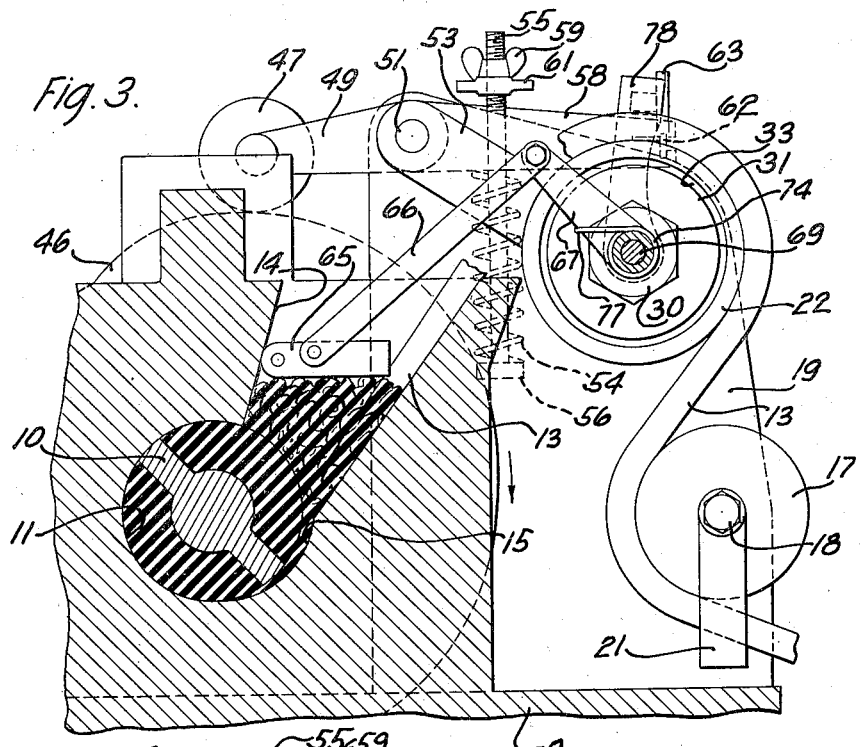

Patented June 16, 1931

1,809,983

UNITED STATES PATENT OFFICE

JOSEPH EVERETT LODGE, OF MAYWOOD, ILLINOIS, ASSIGNOR TO WESTERN ELECTRIC COMPANY, INCORPORATED, OF NEW YORK, N. Y., A CORPORATION OF NEW YORK

MATERIAL FEEDING DEVICE

Application filed January 2, 1929. Serial No. 329,809.

This invention relates to material feeding devices, and more particularly to a device for regulating the amount of rubber fed to an extruding machine.

An object of this invention is the provision of a simple, and effective mechanism for regulating the feeding of material to a process machine.

In accordance with one embodiment the invention contemplates the provision of mechanism for feeding rubber in strip form to an extrusion machine having a feed worm which draws the strip into a supply chamber at a rate slightly faster than its rate of consumption by the machine. In order to prevent the extruding device from over feeding, the strip is fed over a spring pressed, spiked drum which retards it and which is positively driven by a pawl and ratchet mechanism controlled by a cam which is driven by the operating mechanism for the worm. The drum is driven at all times except when there is an excess of material in the extruding device, when a lever movable in response to the excess material will render the pawl and ratchet mechanism inoperative.

Figure 1:
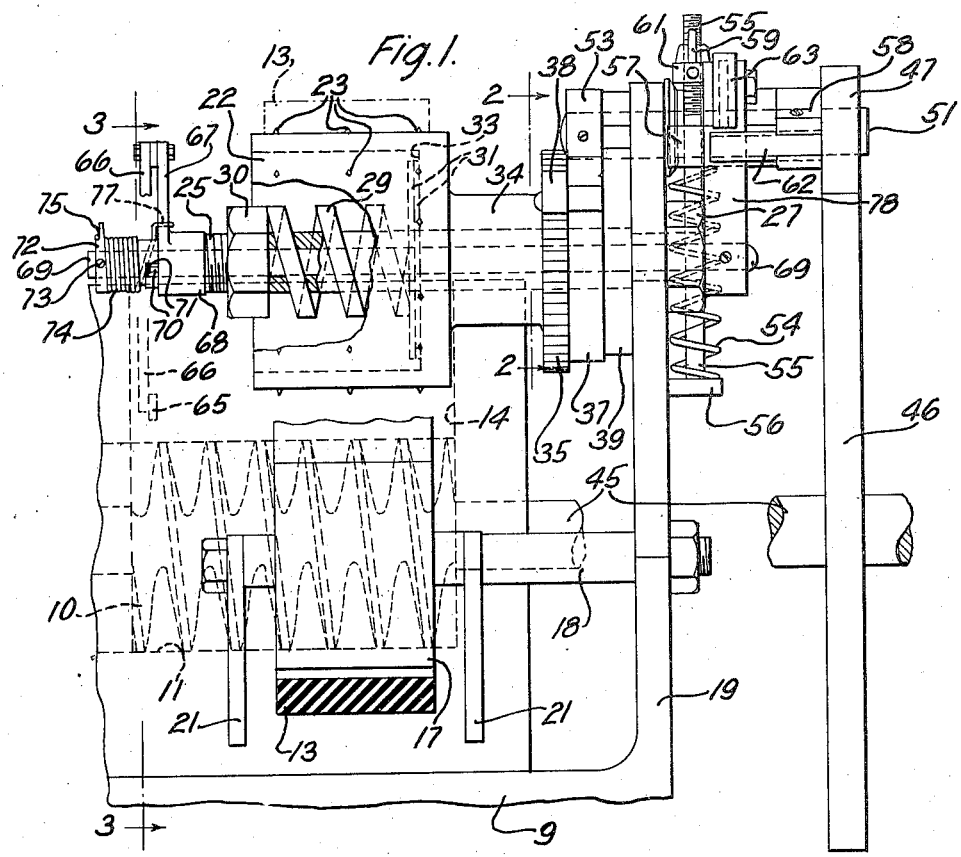
Figure 2:
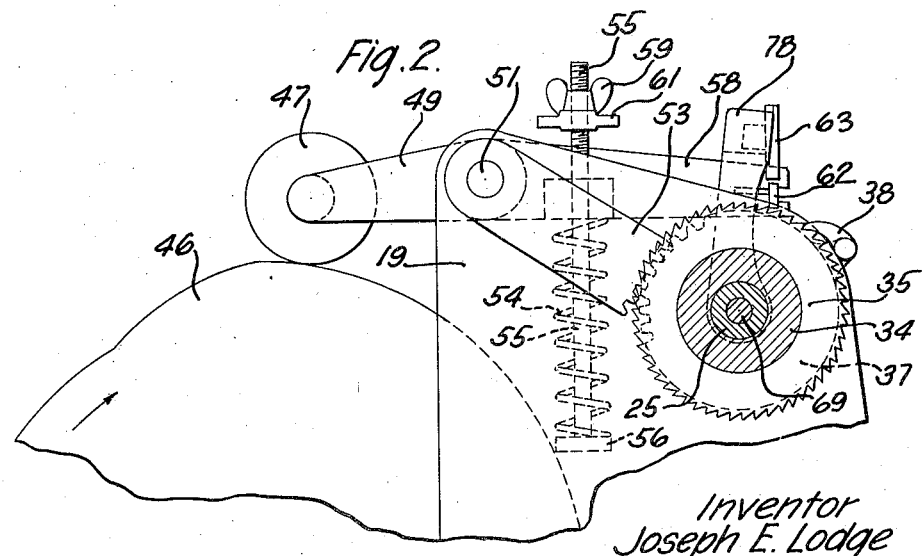

Other objects and advantages of this invention will become apparent from the following detailed description when considered in connection with the accompanying drawings, wherein Fig. 1 is a fragmentary front elevational view of an extruding machine having a feed mechanism embodying features of the invention, a part of which is shown in section;

Figs. 2 and 3 are sectional views taken on the line 2—2 and 3—3, respectively, of Fig. 1 in the direction of the arrows, and Fig. 4 is an end elevational view of the apparatus shown in Fig. 1.

Referring now to the drawings wherein like reference numerals designate the same parts throughout the several views, the numeral 9 designates generally the framework of an extrusion machine having a feed worm 10, positioned in a chamber 11 for forcing rubber compound into an extrusion chamber (not shown). A strip 13 of rubber compound is fed to the feed worm through a triangular-shaped slot 14 which terminates in a crescent shaped recess 15 at the bottom of the chamber 11 so that the strip of rubber compound will be drawn under the worm and forced into the extrusion chamber.

In order to insure an adequate supply of material in the extrusion chamber 11, the crescent shaped recess is formed so that the worm will normally draw the compound into the chamber faster than it can be used by the extruding apparatus. The supply must therefore be retarded so that the excess of compound will not become too great. The strip of rubber compound is drawn from a source of supply (not shown) and passed over an idler roller 17 mounted on a shaft 18 which is secured to an upright member 19 and which also has guides 21—21 for maintaining the strip in position on the idler. After passing over the idler the strip is passed over a drum 22 provided with radially projecting pins 23—23 which penetrate the surface of the strip so that the strip cannot be advanced at a speed greater than the peripheral speed of the drum.

The drum 22 is rotated about a rigid hollow spindle 25 secured to the upright 19 by a shoulder 26 formed on the spindle and engaging the upright and a nut 27 threaded on the end of the spindle. Movement of the drum is retarded by a spring 29 coiled about the spindle and positioned between a nut 30 threaded on the end of the spindle and friction thrust bearings 31—31 which engage an end wall 33 of the drum. Interposed between an annular hub 34 formed on the drum and the upright 19 are an annular ratchet gear 35 secured to the hub, a disk 37 rotatable about the spindle and carrying a pawl 38 for operatively engaging the ratchet, and a washer 39. The pressure of the spring upon the thrust bearings may be regulated so that the drum cannot be rotated by the action of the drum drawing the strip into the chamber, but may be driven by the pawl and ratchet mechanism described hereinbefore.

The apparatus for driving the pawl and ratchet will next be described. A shaft 45 which drives the worm 10 has a cam 46 mounted thereon and rotated thereby. The cam 46 engages and actuates a cam roller 47 mounted on a lever 49 secured to a shaft 51 which is journalled in the upright 19. A segmental gear 53 is secured to the shaft 51 and meshes with a gear segment 52 formed on the disk 37 to impart an oscillating motion thereto upon the actuation of the cam roller by the cam.

A compression spring 54 is provided for urging the cam roller downwardly into engagement with the camming surface of the cam 46 and is positioned about a rod 55 mounted on a projecting portion 56 of the upright 19. The spring 54 is interposed between the projecting portion 56 and a shoulder 57, through which the rod 55 is passed, formed on an arm 58 and urges the arm 58 which is secured to the shaft 51 upwardly. The upward movement of the arm 58, and consequently the downward movement of the cam roller may be regulated by means of a thumb nut 59 and a lock nut 61, threaded on the upper end of the rod 55. This adjustment permits the regulation of the amount of compound fed into the machine, since it limits the amount of movement of the segmental gear and thereby limits the amount of rotation of the drum 22. The arm 58 carries at its extreme end a cross member 62 which may be engaged by a locking member 63 to maintain the arm 49 in a position such that the cam roller 47 mounted thereon will not operatively engage the cam.

In the event that any excess of material is fed to the chamber 11, the surplus will accumulate at the left end (Fig. 1) of the chamber 11 due to the action of the worm. To limit this excess to a predetermined amount, a lever 65 is placed in the slot 14 and normally occupies the position shown in Fig. 1. If the amount of the material in the chamber exceeds a predetermined amount the lever 65 will be moved upwardly and will force a pusher rod 66, to which it is pivotally attached, upwardly.

The pusher rod at its upper end is pivoted to a lever 67 extending from a sleeve 68 which is positioned about a shaft 69 journalled in the hollow spindle 25. The sleeve has an axially disposed projection 70 formed thereon which extends into a slot 71 formed in a sleeve 72 pinned to the shaft at 73. The lever 67 is urged downwardly to maintain the lever 65 in contact with the material in the chamber by a spring 74, which encircles the sleeve 72 and is secured thereto at 75 and which engages the lever 67 at 77. Thus the lever 65 is movable a predetermined amount before becoming effective to rotate the shaft 69, but upon the excess in the chamber 11 reaching a predetermined amount, the lever will be effective to rotate the shaft. Upon rotation of the shaft due to an excess of material in the chamber, a lever 78 attached to the right end of the shaft (Fig. 1) will be moved so that the locking member 63 which is secured to the lever 78 will be moved to a position where it will engage the cross member 62 and hold the cam roller out of operative engagement with the cam to stop the rotation of the drum.

It is believed that a clear understanding of the apparatus described herein will be had by reference to the following description of the operation thereof: A strip of rubber compound is passed from a source of supply (not shown) over the idler 17, the spiked drum 22, and thence to the feed worm which forces it into an extrusion chamber (not shown). The chamber in which the worm is positioned is of a construction such that the worm will tend to draw the rubber strip into the chamber faster than it can be extruded by the extrusion mechanism. However, the drum 22 is retarded by the spring 29 so that the force of the rubber being drawn into the chamber by the worm 10 is insufficient to rotate it. Thus the supply of compound in strip form fed to the worm will be interrupted unless the pawl and ratchet mechanism is actuated by the cam and cam roller.

The pawl and ratchet mechanism will be driven at all times except when an excess of compound accumulates in the chamber 11, when the lever 65 will be moved upwardly to rotate the shaft 69 and carry the locking member 63 to a position where the cross member 62 will be engaged thereby, upon the next movement of the cam roller upwardly. The lever 65 resting upon the surplus of compound in the chamber 11 will maintain the locking member 63 in this position until the extruding machine uses a predetermined amount of material whereupon the lever will move downwardly due to the lowering of the amount of material in the chamber and will consequently move the locking member out of the path of the cross members 62, permitting the drum to again be positively driven.

Although this invention has been described herein as controlling the feeding of material in strip form to extruding machines, it is also adapted to many other types of mechanisms and should be limited only by the scope of the appended claims.

What is claimed is:

1. In a material feeding apparatus, movable means for retarding the material being fed, and means responsive to the amount of material fed for controlling the movement of the material retarding means.

2. In material feeding apparatus, means for retarding the material being fed, and means responsive to the amount of material fed for varying the effectiveness of the means for retarding the material.

3. In material feeding apparatus, rotatable means for retarding material being fed, and means responsive to an excess of material for interrupting the rotation of the rotatable means, and effective upon a predetermined decrease in the excess to start the rotatable means rotating.

4. In material feeding apparatus, a rotatable drum for engaging the material being fed, means for retarding the movement of the rotatable drum, means for rotating said drum, and means responsive to the amount of material fed for controlling the operation of the drum rotating means.

5. In material feeding apparatus, a material advancing worm, a cam connected thereto, a segmental gear oscillated by the cam, a pawl and ratchet mechanism driven by the segmental gear, a drum actuated by the pawl and ratchet mechanism for engaging the material to be fed, means for retarding the movement of the drum, and means engaging the material fed for rendering the cam inoperative.

6. In material feeding apparatus a worm for feeding the material, a cam connected thereto, a rotatable drum actuated by said cam, and a lever movable in response to an excess of material for rendering the cam inoperative.

7. In a material feeding apparatus, means for advancing material, means for preventing rotation of the advancing means by the material, means for positively rotating the advancing means, and means responsive to an accumulation of the material being fed for interrupting the positive rotation of the advancing means.

8. In material feeding apparatus, means for advancing material, locking means effective for rendering the advancing means inoperative, a lever engaging the material advanced and freely movable thereby, and means actuated by the lever for controlling the effectiveness of the locking means.

9. In material feeding apparatus, a chamber having a material advancing worm therein, a hopper connected to the chamber, means for advancing material to the hopper, locking means for rendering the advancing means inoperative, a lever positioned in the hopper, engaging and movable by the material therein, and means actuated by the lever for controlling the effectiveness of the locking means.

10. In material feeding apparatus, a hopper, means for advancing material to the hopper, a lever positioned in the hopper and movable by an accumulation of material therein, a shaft rotatable in response to the movement of the lever, a cam for actuating the means for advancing material to the hopper, and a locking member actuated by said shaft for interrupting the actuation of the advancing means by the cam.

In witness whereof, I hereunto subscribe my name this 21st day of December, A. D. 1928.

JOSEPH EVERETT LODGE.